(12) United States Patent
Egami et al.

(10) Patent No.: US 10,116,827 B2
(45) Date of Patent: Oct. 30, 2018

(54) IMAGE FORMING APPARATUS

(71) Applicant: KYOCERA Document Solutions Inc., Osaka (JP)

(72) Inventors: Ryo Egami, Osaka (JP); Koji Minakuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/689,788

(22) Filed: Aug. 29, 2017

(65) Prior Publication Data
US 2018/0063363 A1    Mar. 1, 2018

(30) Foreign Application Priority Data
Aug. 31, 2016   (JP) ................................ 2016-168942

(51) Int. Cl.
| | |
|---|---|
| *H04N 1/00* | (2006.01) |
| *H04N 1/23* | (2006.01) |
| *G06F 3/12* | (2006.01) |
| *H04N 1/56* | (2006.01) |

(52) U.S. Cl.
CPC ......... *H04N 1/2384* (2013.01); *G06F 3/1243* (2013.01); *H04N 1/00795* (2013.01); *H04N 1/56* (2013.01); *H04N 2201/0094* (2013.01)

(58) Field of Classification Search
CPC ............... G06F 3/1243; H04N 1/2384; H04N 1/00795; H04N 1/56; H04N 2201/0094
See application file for complete search history.

(56) References Cited

U.S. PATENT DOCUMENTS

| | | | | |
|---|---|---|---|---|
| 5,951,057 A | * | 9/1999 | Spector ................ | B42D 15/045 2/246 |
| 6,349,829 B1 | * | 2/2002 | Matheis ................. | B65D 29/04 206/39 |
| 2006/0289625 A1 | * | 12/2006 | Tamune ................... | G09B 1/00 235/375 |
| 2009/0296124 A1 | * | 12/2009 | Ohguro ................. | G06F 17/241 358/1.9 |
| 2013/0280498 A1 | * | 10/2013 | Horiuchi ................. | B42C 19/02 428/195.1 |
| 2015/0087384 A1 | * | 3/2015 | Brewer ................... | G07F 17/34 463/20 |
| 2016/0357487 A1 | * | 12/2016 | Anbalagan .............. | G06F 17/24 |

FOREIGN PATENT DOCUMENTS

JP        2003-060927 A    2/2003

\* cited by examiner

*Primary Examiner* — Moustapha Diaby
(74) *Attorney, Agent, or Firm* — Studebaker & Brackett PC

(57) ABSTRACT

An image forming apparatus includes a reading section and an image forming section. The reading section reads a plurality of images from a document. The image forming section forms the plurality of read images on a sheet. The plurality of images include a first image and a second image. The first image has a first color. The second image has a second color. The second color is different from the first color. The image forming section forms the first image on a first main side of the sheet and the second image on a second main side of the sheet.

7 Claims, 8 Drawing Sheets

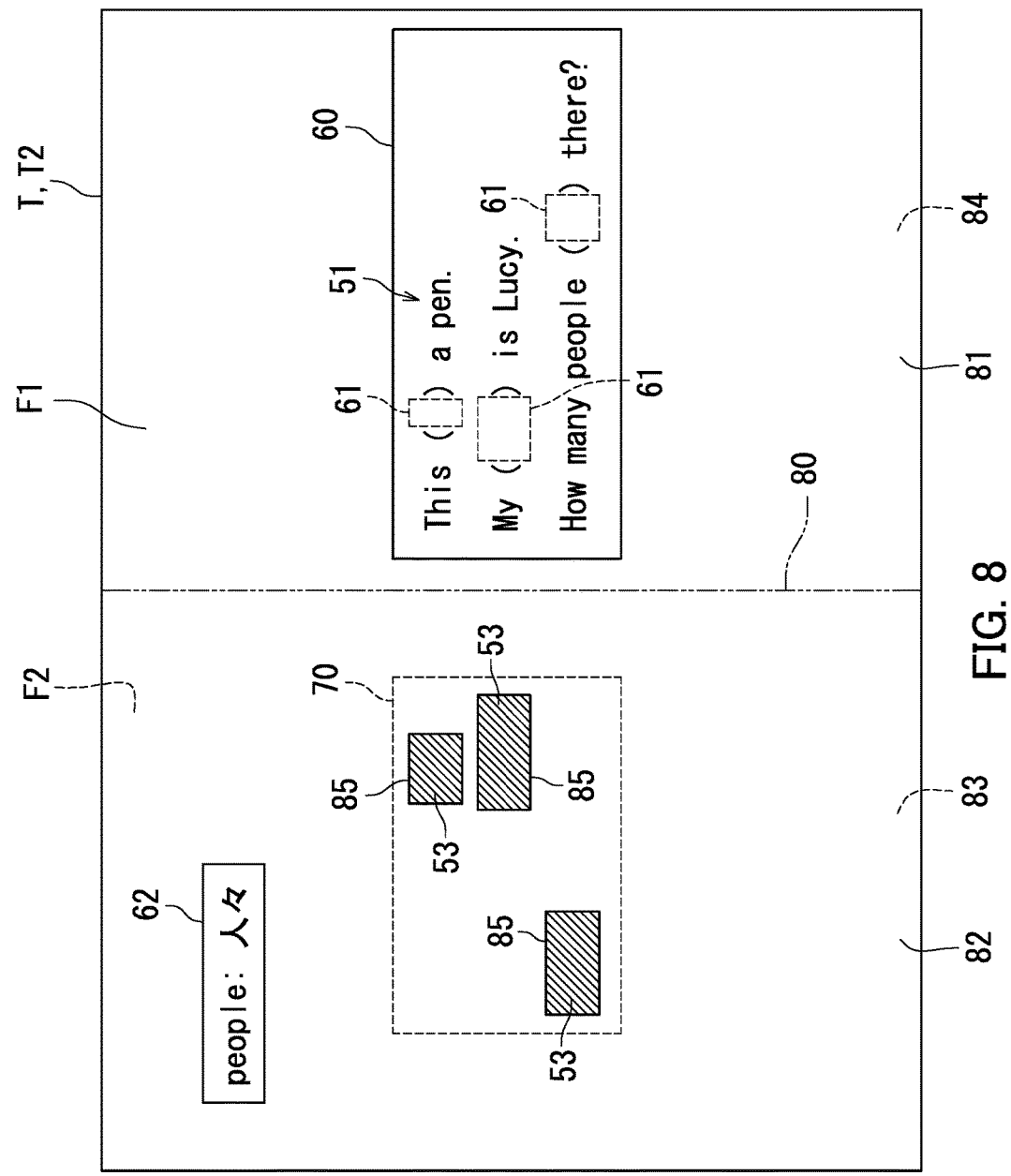

IMAGE FORMING APPARATUS

INCORPORATION BY REFERENCE

The present application claims priority under 35 U.S.C. § 119 to Japanese Patent Application No. 2016-168942, filed on Aug. 31, 2016. The contents of this application are incorporated herein by reference in their entirety.

BACKGROUND

The present disclosure relates to image forming apparatuses.

In one example, a processing device performs a process for preparing a printing plate for multicolor printing. The processing device controls a scanner to read a multicolor document. The processing device divides the read multicolor document into a plurality of regions each having a different color. The processing device prepares a plurality of printing plates corresponding to the plurality of regions.

SUMMARY

An image forming apparatus according to the present disclosure includes a reading section and an image forming section. The reading section reads a plurality of images from a document. The image forming section forms the plurality of read images on a sheet. The plurality of images include a first image and a second image. The first image has a first color. The second image has a second color. The second color is different from the first color. The image forming section forms the first image on a first main side of the sheet and the second image on a second main side of the sheet.

BRIEF DESCRIPTION OF THE DRAWINGS

FIG. 8 is a diagram illustrating the sheet, which is illustrated in FIG. 5, having a third image formed thereon.

DETAILED DESCRIPTION

Figure 1:
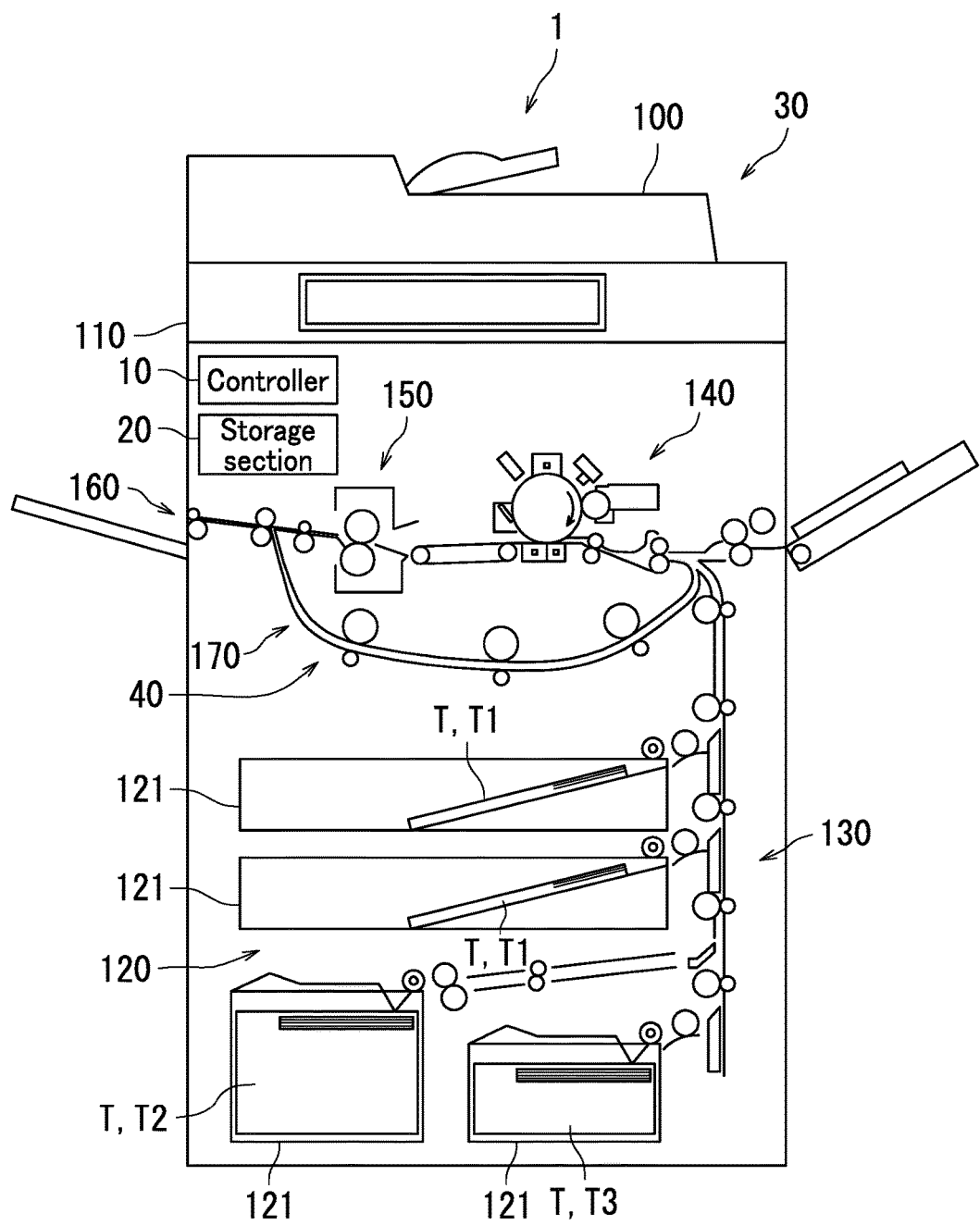
FIG. 1 is a diagram illustrating an image forming apparatus according to an embodiment of the present disclosure.

The following describes embodiments of the present disclosure with reference to FIGS. 1 to 8. Elements that are the same or equivalent are indicated by the same reference signs in the drawings and description thereof is not repeated.

The following describes a general configuration of an image forming apparatus according to an embodiment of the present disclosure with reference to FIG. 1. FIG. 1 illustrates an image forming apparatus 1 according to the embodiment of the present disclosure. The image forming apparatus 1 is for example a multifunction peripheral.

As illustrated in FIG. 1, the image forming apparatus 1 includes a controller 10, a storage section 20, a document reading mechanism 30, and an image forming mechanism 40. The image forming apparatus 1 creates a fill-in-the-blank learning material. The learning material includes a question and an answer to the question. The question and the answer are in symbol strings. The "symbols" encompass characters and narrowly defined symbols (for example, an exclamation mark "!", a percent sign "%", and a number sign "#"). The "answer" refers to a symbol string corresponding to a blank portion, among all the symbol strings in the learning material. The "question" refers to a symbol string corresponding to a non-blank portion, among all the symbol strings in the learning material.

The controller 10 includes a central processing unit. The controller 10 controls the storage section 20, the document reading mechanism 30, and the image forming mechanism 40. The controller 10 performs a material creating process. The material creating process is a process for creating a question and an answer of a learning material. The controller 10 also performs an optical character recognition process.

Various pieces of information are stored in the storage section 20. The various pieces of information include a dictionary containing English words and a list of English words that are learned in all grades of a junior high school.

The document reading mechanism 30 includes a document feed section 100 and a reading section 110. The document feed section 100 conveys a document to the reading section 110. The document includes a plurality of images. The reading section 110 reads the plurality of images from the document.

The image forming mechanism 40 includes an accommodation section 120, a conveyance section 130, an image forming section 140, a fixing section 150, an ejection section 160, and a reverse conveyance section 170. The image forming mechanism 40 has two operating modes. The two operating modes are a simplex printing mode and a duplex printing mode. The simplex printing mode is an operating mode in which an image is formed only on one main side (a first main side) of two main sides (first and second main sides) of a sheet T. The duplex printing mode is an operating mode in which images are formed on the respective two main sides of the sheet T.

The accommodation section 120 includes a plurality of cassettes 121 and accommodates a plurality of the sheet T. The cassettes 121 each support the sheet T. The sheet T includes plain paper T1, thin paper T2, and an overhead projector (OHP) film T3.

The conveyance section 130 conveys the sheet T from the accommodation section 120 to the ejection section 160 through the image forming section 140 and the fixing section 150.

The image forming section 140 forms, on the sheet T, the plurality of images read by the reading section 110. The plurality of images on the document include a first image and a second image. The first image has a first color. The second image has a second color. The second color is different from the first color. For example, the first color is black, and the second color is red. Data representing the first color and data representing the second color are stored in the storage section 20.

In the storage section 20, RGB data is for example stored as the data representing the first color and the data representing the second color. The RGB data includes values representing lightness of three primary colors (red (R), green (G), and blue (B)). The RGB data for example indicates the lightness of each of the three primary colors using values at 256 levels. In such a case, the color red is represented by RGB data (256, 0, 0). The color green is represented by RGB data (0, 256, 0). The color blue is represented by RGB data (0, 0, 256).

In the duplex printing mode, the image forming section 140 forms the first image on the first main side of the sheet T and the second image on the second main side of the sheet T. The first image shows a question of the fill-in-the-blank learning material. The second image shows an answer to the question. The image forming section 140 also forms a third image in a region of the first main side. The region in which the third image is formed overlaps a region where the second image is formed. The third image is formed to hide a mirror image of the second image in a situation in which the mirror image of the second image is visible at the first main side through the sheet T. The third image is for example a solid image.

After the first image has been formed on the sheet T, the fixing section 150 applies heat and pressure to the sheet T to fix the first image to the sheet T. Furthermore, after the second image has been formed on the sheet T, the fixing section 150 applies heat and pressure to the sheet T to fix the second image to the sheet T. The ejection section 160 ejects the sheet T having the first and second images formed thereon.

In the duplex printing mode, after the first image has been formed on the first main side of the sheet T, the reverse conveyance section 170 conveys the sheet T from a location downstream of the fixing section 150 to a location upstream of the image forming section 140 so that the second image is formed on the second main side of the sheet T.

Figure 2:
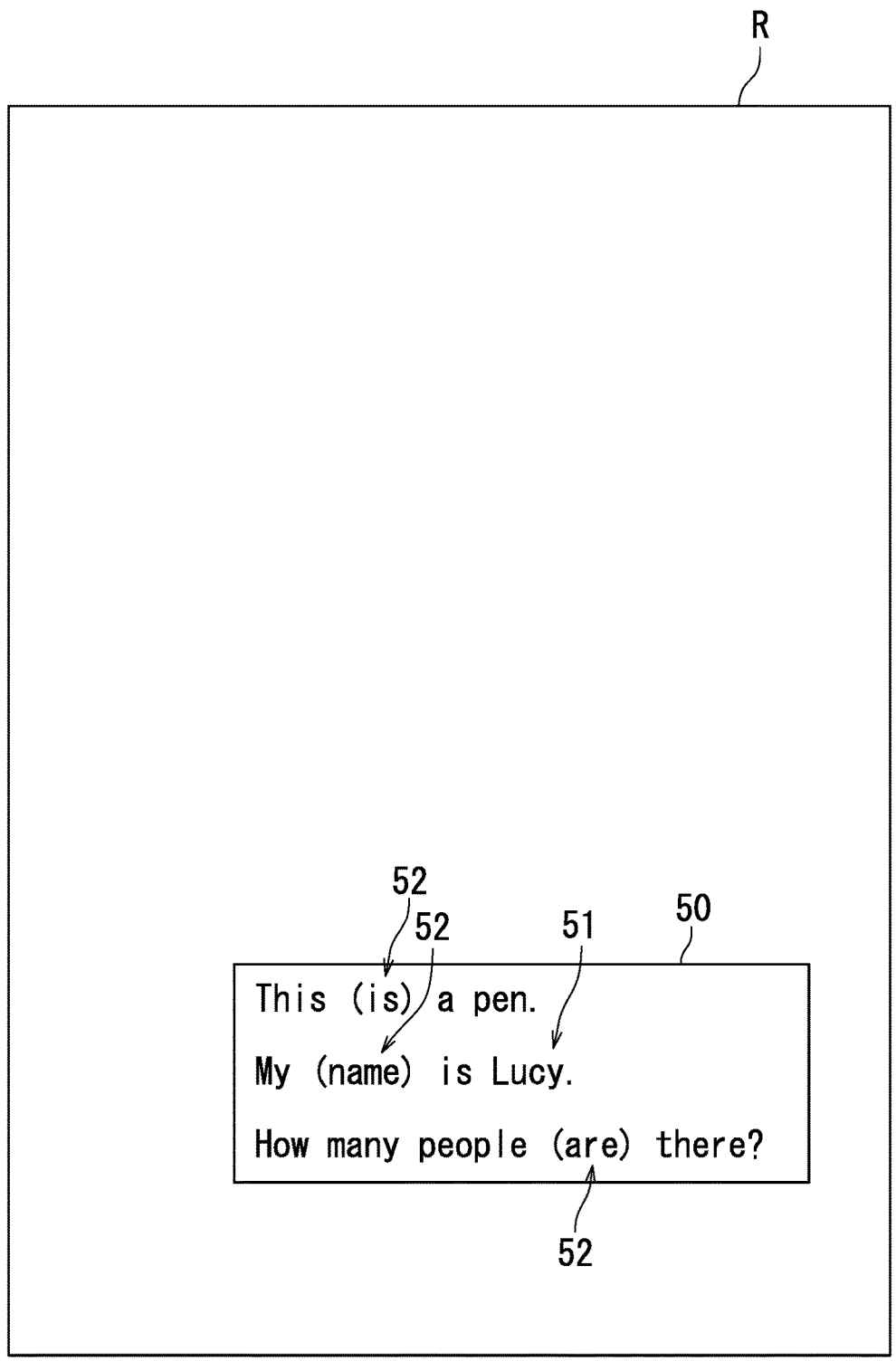
FIG. 2 is a diagram illustrating a document.
Figure 3:
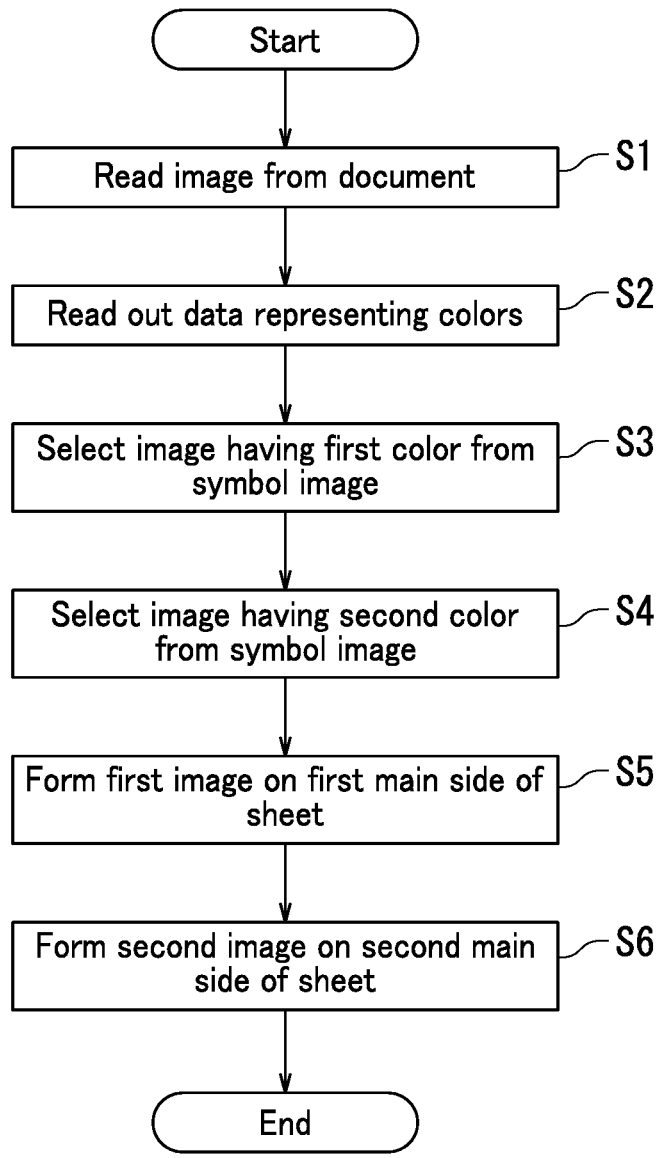
FIG. 3 is a flowchart illustrating a process of creating a memorization material.

The following describes operation of the controller 10 with reference to FIGS. 2 and 3. FIG. 2 illustrates a document R. The document R according to the present embodiment is an A4 size document. However, the document R may not be an A4 size document.

As illustrated in FIG. 2, the document R has a symbol image 50 showing a plurality of symbols. The symbol image 50 shows English sentences that are supposed to be learned in the seventh grade.

More specifically, the symbol image 50 includes a plurality of images (a first image 51 and a second image 52). The first image 51 includes one or more symbols. The second image 52 includes one or more symbols. The second image 52 includes an image of a symbol string "is", an image of a symbol string "name", and an image of a symbol string "are". The first image 51 is an image that is included in the symbol image 50 and that is not the second image 52.

FIG. 3 is a flowchart illustrating a process of creating a fill-in-the-blank learning material. As illustrated in FIG. 3, in Step S1, the controller 10 controls the document reading mechanism 30 to read the symbol image 50 from the document R. Controlled by the controller 10, the reading section 110 reads the symbol image 50 from the document R.

In Step S2, the controller 10 reads out the data representing the first color and the data representing the second color from the storage section 20.

In Step S3, the controller 10 selects the first image 51 from the read symbol image 50 based on the data representing the first color. In a situation in which the first color (black) is represented by RGB data (0, 0, 0), for example, the controller 10 selects, as the first image 51, an image having RGB data (0, 0, 0) from the symbol image 50.

In Step S4, the controller 10 selects the second image 52 from the read symbol image 50 based on the data representing the second color. In a situation in which the second color (red) is represented by RGB data (256, 0, 0), for example, the controller 10 selects, as the second image 52, an image having RGB data (256, 0, 0) from the symbol image 50.

In Step S5, the controller 10 controls the image forming mechanism 40 to form the selected first image 51 on the first main side of the sheet T. Controlled by the controller 10, the image forming section 140 forms the first image 51 in one of two regions of the first main side that are created by dividing the first main side in half in terms of a longitudinal direction.

In Step S6, the controller 10 controls the image forming mechanism 40 to form the selected second image 52 on the second main side of the sheet T. Controlled by the controller 10, the reverse conveyance section 170 conveys the sheet T to the location upstream of the image forming section 140. The image forming section 140 forms the second image 52 in one of two regions of the second main side that are created by dividing the second main side in half in terms of a longitudinal direction.

According to the image forming apparatus 1 of the present embodiment, as described above with reference to FIGS. 1 to 3, the first image 51 of the symbol image 50 is formed on the first main side of the sheet T. The second image 52 of the symbol image 50 is formed on the second main side of the sheet T. Thus, the image showing questions (the first image 51) of the symbol image 50 can be formed on the first main side of the sheet T. Furthermore, the image showing answers (the second image 52) of the symbol image 50 can be formed on the second main side of the sheet T. As a result, both the questions and the answers in the fill-in-the-blank learning material can be formed on one sheet T, allowing easy management of questions and answers, and improvement in usability.

The following describes the material creating process in more detail with reference to FIGS. 4 to 8 as well as FIGS. 1 to 3.

Figure 4:
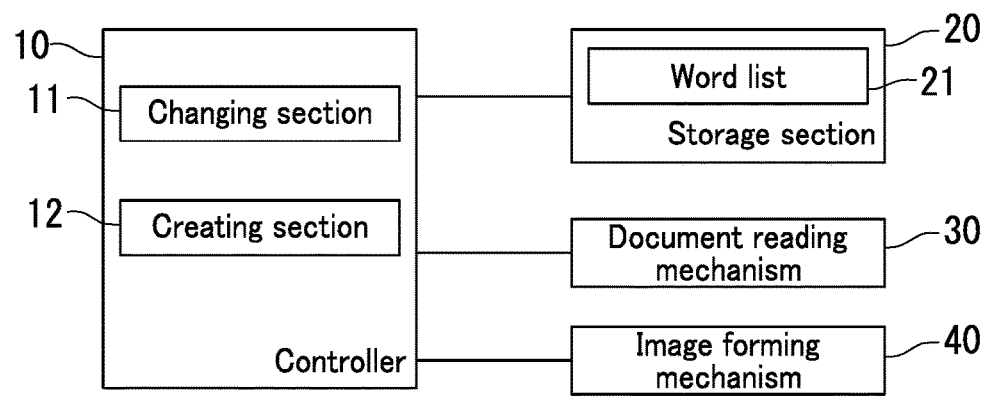
FIG. 4 is a diagram illustrating a controller illustrated in FIG. 1.

FIG. 4 illustrates the controller 10. The controller 10 includes a changing section 11 and a creating section 12. A word list 21 containing English words that are learned in all grades of a junior high school is further stored in the storage section 20. The controller 10 implements the changing section 11 and the creating section 12 through execution of a computer program stored in the storage section 20.

The changing section 11 changes the color of the second image 52 to a color different from the second color. The image forming section 140 forms the second image 52 in the different color on the second main side. For example, the changing section 11 changes the color of the second image 52 to the first color.

The creating section 12 refers to the word list 21 to create a bilingual image showing an English word and a translation thereof.

Figure 5:
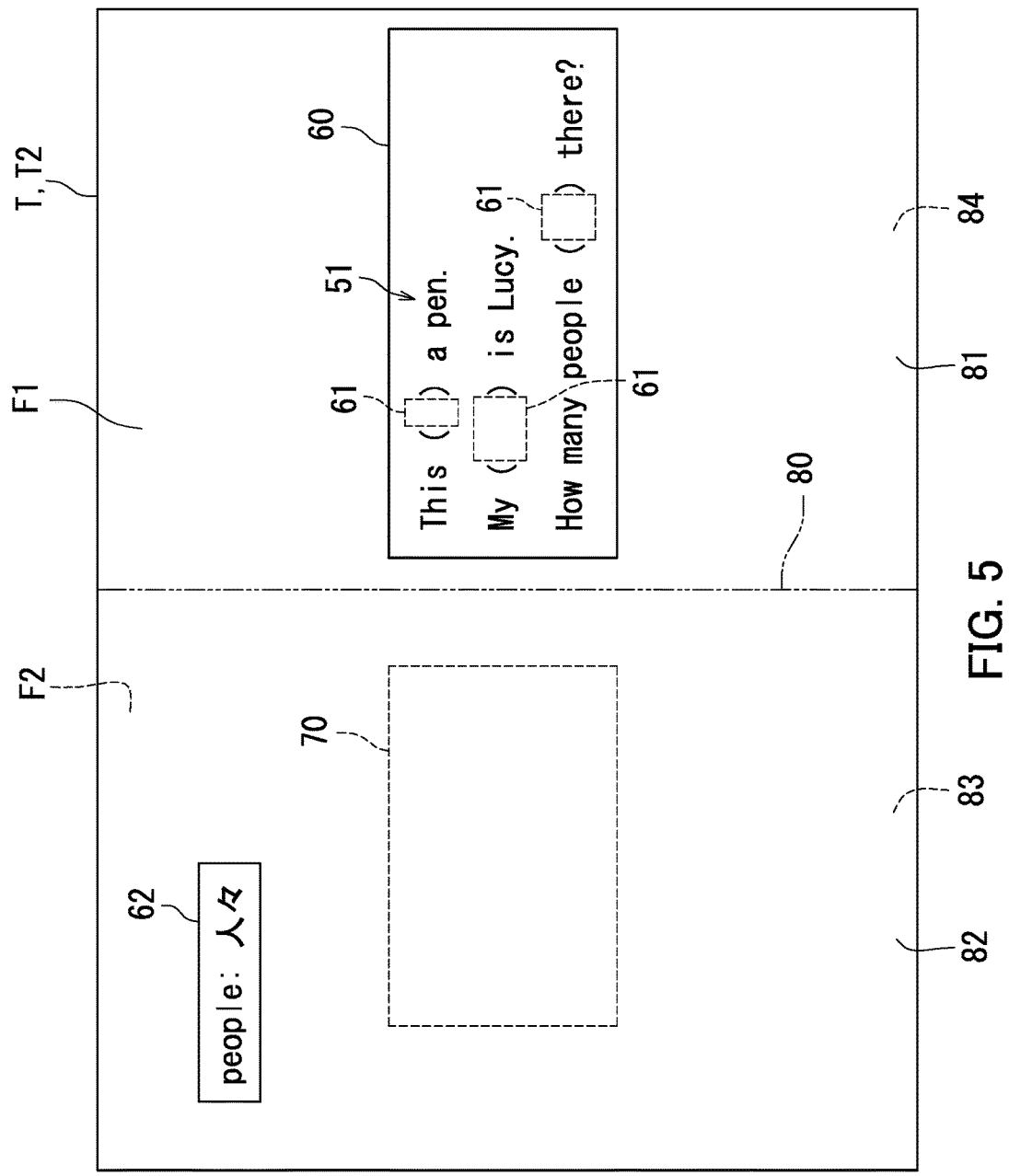
FIG. 5 is a diagram illustrating a first main side of a sheet.

The following describes the bilingual image and a question image showing questions of a fill-in-the-blank learning material with reference to FIG. 5. FIG. 5 shows a first main side F1 of the sheet T. The sheet T according to the present embodiment is A4 size thin paper T2. However, the thin paper T2 may not be an A4 size paper.

As illustrated in FIG. 5, the sheet T has the first main side F1 and a second main side F2. The first main side F1 has a first region 81 and a second region 82.

The second main side F2 has a third region 83 and a fourth region 84. A question image 60 is formed in the first region 81. A bilingual image 62 is formed in the second region 82. An answer image 70 showing answers to the questions is formed in the third region 83. The first region 81 and the second region 82 are two regions of the first main side F1 that are created by dividing the first main side F1 along a perpendicular bisector 80 of longer edges of the sheet T. The third region 83 is a region that overlaps the second region 82. The fourth region 84 is a region that overlaps the first region 81.

The question image 60 corresponds to the first image 51 and shows questions in an English learning material for seventh graders. The bilingual image 62 shows an English word and a translation thereof. The English word is one of English words shown by the question image 60 and belongs to a specific group. The bilingual image 62 is created by the creating section 12.

Specifically, the creating section 12 selects an English word belonging to a specific group from among the English words shown by the question image 60 to create the bilingual image 62 showing the selected English word and a translation thereof. More specifically, the creating section 12 recognizes the English words shown by the first image 51 of the document R through for example an optical character recognition process. The creating section 12 compares the recognized English words against the word list 21 to select an English word belonging to the specific group from among the recognized English words. For example, the creating section 12 selects an English word (people) that is not learned by the end of the seventh grade from among the English words shown by the first image 51. The creating section 12 then creates the bilingual image 62 showing the selected English word and a translation thereof (people: hitobito). The image forming section 140 forms the bilingual image 62 created by the creating section 12 in the second region 82 of the first main side F1.

As illustrated in FIG. 5, the question image 60 includes the first image 51 and a blank section 61. The blank section 61 corresponds to the second image 52 illustrated in FIG. 2. More specifically, the question image 60 is equivalent to an image obtained by removing the second image 52 from the symbol image 50. Accordingly, a location of the blank section 61 corresponds to a location of the second image 52.

Figure 6:
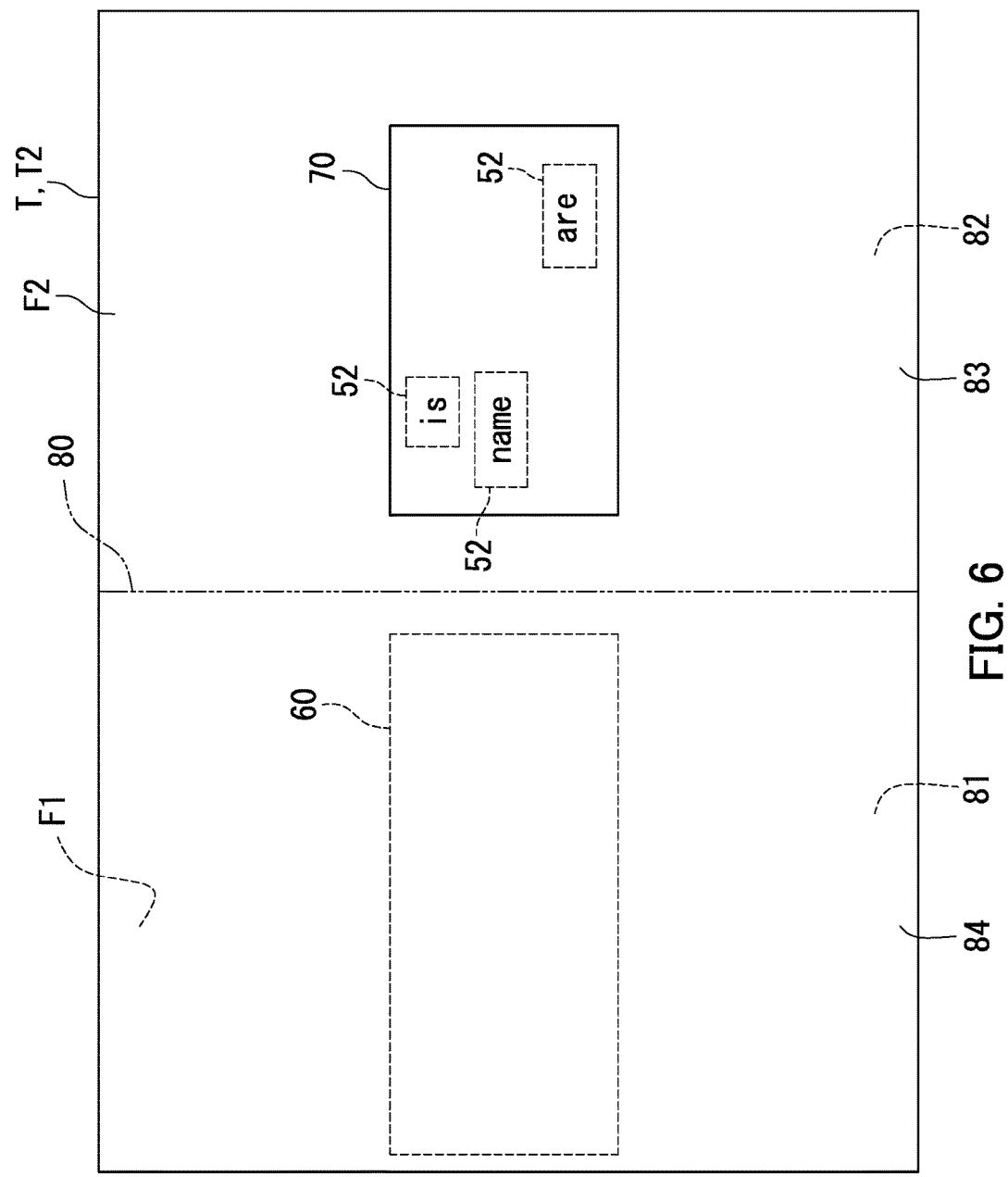
FIG. 6 is a diagram illustrating a second main side of the sheet illustrated in FIG. 5.

The following describes the answer image 70 with reference to FIG. 6. FIG. 6 shows the second main side F2 of the sheet T illustrated in FIG. 5. As illustrated in FIG. 6, the answer image 70 corresponds to the second image 52. The answer image 70 according to the present embodiment shows a plurality of English words (is, name, and are).

The following describes the changing section 11 with reference to FIGS. 4 and 6. The changing section 11 changes the color of the second image 52 to a color different from the second color. The image forming section 140 forms the second image 52 in the different color on the second main side F2. For example, the changing section 11 changes the color of the second image 52 to the first color. Accordingly, the second image 52 in the first color is formed as the answer image 70 illustrated in FIG. 6. As a result, even if the image forming apparatus 1 does not have a color printing function, questions of a memorization material and answers of the memorization material can be created.

Figure 7:
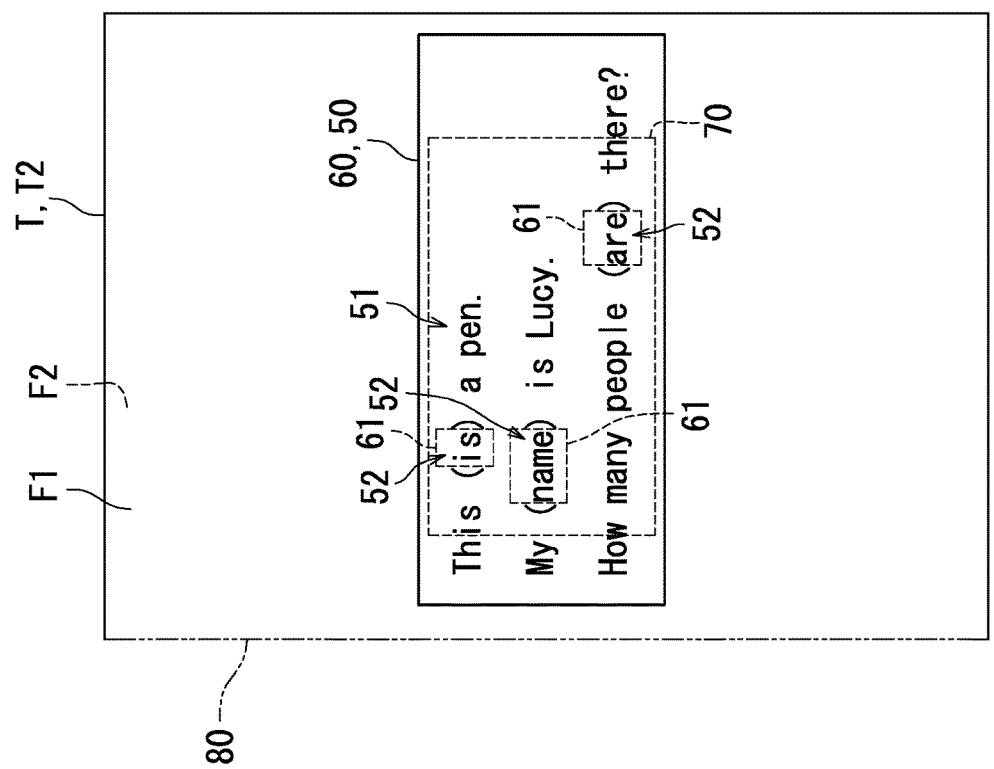
FIG. 7 is a diagram illustrating the sheet, which is illustrated in FIG. 5, folded in half.

FIG. 7 illustrates the sheet T, which is illustrated in FIG. 5, folded in half. More specifically, the sheet T is folded along the perpendicular bisector 80 such that a part of the sheet T (the question image 60) covers the answer image 70 (the second image 52) formed on the second main side F2. While the sheet T is folded, the answer image 70 (the second image 52) is visible at the first main side F1 through the part of the sheet T.

The first image 51 is formed on the first main side F1 of the sheet T and the second image 52 is formed on the second main side F2 of the sheet T such that the answer image 70 (the second image 52) that is visible at the first main side F1 through the part of the sheet T and the question image 60 (the first image 51) form the symbol image 50 as illustrated in FIG. 7. That is, the first image 51 is formed on the first main side F1 and the second image 52 is formed on the second main side F2 such that the second image 52 is visible in the blank section 61 at the first main side through the part of the sheet T.

According to the image forming apparatus 1 of the present embodiment, as described above with reference to FIGS. 4 to 7, the answer image 70 (the second image 52) and the question image 60 (the first image 51) are formed such that when the sheet T is folded in half along the perpendicular bisector 80, the answer image 70 is visible at the first main side F1 through the sheet T, and the answer image 70 and the question image 60 on the first main side F1 form the symbol image 50. A user can therefore easily specify English words corresponding to the respective blanks included in the question image 60 from among the plurality of English words shown by the answer image 70 and easily recognize the answers to the questions.

According to the image forming apparatus 1 of the present embodiment, as described with reference to FIGS. 4 to 7, the question image 60 and the answer image 70 are formed on a semitransparent sheet T such as the thin paper T2. A user can therefore easily see the second image 52 at the first main side F1 through the sheet T and easily recognize the answers to the questions.

In a case where the question image 60 and the answer image 70 are formed on a transparent sheet T such as the OHP film T3, a user can see the second image 52 at the first main side F1 through the sheet T more easily. As a result, the user can recognize the answers to the questions more easily.

The following describes the third image with reference to FIG. 8. FIG. 8 illustrates the sheet T, which is illustrated in FIG. 5, having a third image 53 formed thereon. As illustrated in FIG. 8, the image forming section 140) forms the third image 53 on the first main side F1 of the sheet T. More specifically, the controller 10 controls the image forming section 140 to form the third image 53 in fifth regions 85 such that the fifth regions 85 are blacked out. The fifth regions 85 are regions of the first main side F1 that overlap the region of the second main side F2 where the answer image 70 (the second image 52) is formed. That is, the fifth regions 85 are included in the second region 82.

According to the image forming apparatus 1 of the present embodiment, as described above with reference to FIG. 8, the third image 53 is formed in the fifth regions 85 of the first main side F1, so that the third image 53 hides the mirror image of the second image 52. That is, the third image 53 hides the second image 52, which is visible at the first main side F1 through the sheet T without the third image 53. Thus, the answer image 70 is prevented from being seen at the first main side F1 without using for example a hand to hide the mirror image of the second image 52. Since only the fifth regions 85 are filled rather than an entire region of the first main side F1 corresponding to the answer image 70, the area filled for hiding the mirror image of the second image 52 can be kept to the minimum necessary. Thus, toner used for hiding the answer image 70 (the second image 52) can be saved.

Preferably, the third image 53 has the same color as the color (for example, the second color) of the second image 52. As a result of the third image 53 having the same color as the second image 52, the answer image 70 can be reliably prevented from being seen at the first main side F1.

Through the above, an embodiment of the present disclosure has been described with reference to the drawings (FIGS. 1 to 8). According to the image forming apparatus 1 of the present embodiment, the first image 51 of the symbol image 50 is formed on the first main side F1 of the sheet T, and the second image 52 of the symbol image 50 is formed on the second main side F2 of the sheet T. Thus, the first image 51, which is for example an image showing questions, and the second image 52, which is for example an image showing answers to the questions, can be formed on one sheet. Such a configuration allows easy management of questions and answers, and improvement in usability.

It should be noted that the present disclosure is not limited to the above embodiment and may be implemented in various different forms that do not deviate from the essence of the present disclosure (for example, as described below in sections (1)-(4)). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiment, such as shapes and dimensions, are merely examples and are not intended as specific limitations. Various alterations may be made so long as there is no substantial deviation from the effects of the present disclosure.

(1) According to the embodiment of the present disclosure, the first image 51 shows problems in a fill-in-the-blank learning material, and the second image 52 shows answers to the questions. However, the present disclosure is not limited to such an embodiment. It is only necessary that one of the first image 51 and the second image 52 shows questions and the other shows answers. That is, the first image 51 may show answers, and the second image 52 may show questions. Accordingly, the questions printed on the second main side F2 may be seen at the first main side F1 through the sheet T.

(2) According to the embodiment of the present disclosure, the question image 60 and the answer image 70 are formed on a semitransparent or transparent sheet T (the thin paper T2 or the OHP film T3). However, the present disclosure is not limited to such an embodiment. The question image 60 and the answer image 70 may for example be formed on the plain paper T1 or thick paper so long as the sheet T has the first main side F1 and the second main side F2. The present disclosure allows easy management of questions and answers, and improvement in usability even if the sheet T is thick paper. Furthermore, the second image formed on the second main side F2 is visible at the first main side F1 through the sheet T even if the sheet T is the plain paper T1. A user can therefore easily specify an English word corresponding to a specific one of a plurality of blanks included in the question image 60 from among a plurality of English words shown by the answer image 70.

(3) According to the embodiment of the present disclosure, the image forming section 140 forms the third image 53 in the fifth regions 85 of the first main side F1. However, the present disclosure is not limited to such an embodiment. The answer image 70 can be prevented from being seen at the first main side F1 by for example entirely filling the second region 82 of the first main side F1 so long as the question image 60 is not filled.

(4) According to the embodiment of the present disclosure, the image forming section 140 forms the question image 60 only in one region (the first region 81) of the two regions (the first region 81 and the second region 82) of the first main side F1. However, the present disclosure is not limited to such an embodiment. The image forming section 140 may form question images on the respective two regions (the first region 81 and the second region 82) of the first main side F1 so long as the first image 51 and the second image 52 do not overlap.

For example, one question image is formed in an upper half of the first region 81, and a corresponding answer image is formed in an upper half of the third region 83. Furthermore, another question image is formed in a lower half of the second region 82, and a corresponding answer image is formed in a lower half of the fourth region 84. As a result of the image forming section 140 forming the two sets of question images and answer images on the sheet T as described above, the two sets of question images and answer images do not overlap each other, and the answers to the respective questions can be recognized easily.

What is claimed is:

1. An image forming apparatus comprising:
a reading section configured to read a plurality of images from a document; and
an image forming section configured to form the plurality of read images on a sheet, wherein
the plurality of images include a first image having a first color and a second image having a second color that is different from the first color,
the image forming section forms the first image on a first main side of the sheet and the second image on a second main side of the sheet, the first main side being one of two opposite sides of the sheet, the second main side being the other of the two opposite sides of the sheet,
the first image shows a question,
the second image shows an answer to the question,
when the sheet is folded such that a part of the sheet covers the second image, the second image is visible at the first main side through the part of the sheet,
the image forming section forms the first image on the first main side and the second image on the second main side in such a manner that the first image and the second image visible at the first main side through the part of the sheet when the sheet is folded such that the part of the sheet covers the second image do not overlap each other and form the same content as the plurality of images, and
the image forming section forms a third image in a region of the first main side to prevent a mirror image of the second image from being visible at the first main side through the sheet when the sheet is not folded, the region of the first main side overlapping a region where the second image is formed, the third image covering and hiding the entirety of the mirror image of the second image.

2. The image forming apparatus according to claim 1, wherein
the third image has the same color as the second image.

3. The image forming apparatus according to claim 1, further comprising
a changing section configured to change the color of the second image to a color different from the second color, and
the image forming section forms the second image in the different color on the second main side.

4. The image forming apparatus according to claim 1, further comprising:
a storage section configured to store therein first data representing the first color and second data representing the second color; and a controller, wherein
the controller:
- reads out the first data and the second data from the storage section;
- selects the first image from the plurality of read images based on the first data; and
- selects the second image from the plurality of read images based on the second data after selecting the first image.

5. The image forming apparatus according to claim 4, wherein
the storage section further stores therein a word list containing English words,
the first image shows a plurality of English words,
the controller:
- compares the plurality of English words shown by the first image against the word list;
- selects an English word belonging to a specific group from among the plurality of English words shown by the first image; and
- creates a bilingual image showing the selected English word and a translation thereof, and the image forming section forms the bilingual image on the first main side of the sheet.

6. The image forming apparatus according to claim 5, wherein
the first main side has a first region and a second region,
the second main side has a third region and a fourth region,
the third region overlaps the second region,
the fourth region overlaps the first region,
the first image is formed in the first region,
the bilingual image is formed in the second region, and
the second image is formed in the third region.

7. The image forming apparatus according to claim 4, wherein
the first data representing the first color and the second data representing the second color each include values representing lightness of three primary colors, which are red, green, and blue.

* * * * *